Nov. 22, 1960  G. J. C. ANDRESEN  2,961,552
TRANSISTOR AMPLITUDE INVERTER SUPPRESSOR SYSTEM
Filed Sept. 17, 1956  2 Sheets-Sheet 1
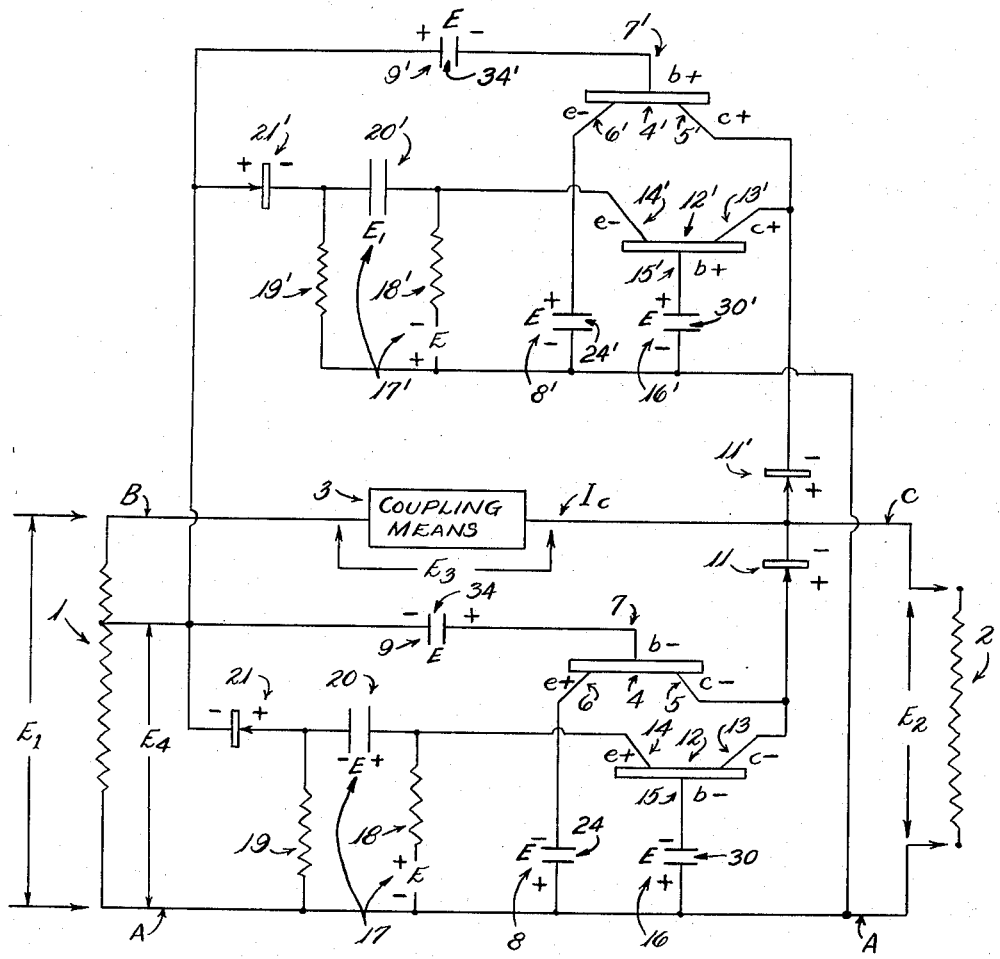
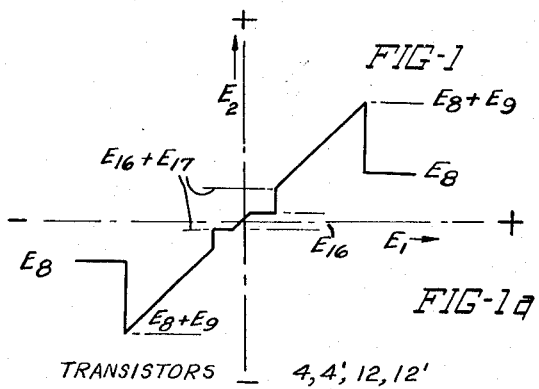
FIG-1
FIG-1a
TRANSISTORS 4,4', 12,12'
INVENTOR.
GILBERT J. C. ANDRESEN
BY Oldham & Oldham
ATTYS.

INVENTOR.
GILBERT J. C. ANDRESEN
BY Oldham & Oldham
ATTYS.

# United States Patent Office 2,961,552
Patented Nov. 22, 1960

2,961,552

TRANSISTOR AMPLITUDE INVERTER SUPPRESSOR SYSTEM

Gilbert J. C. Andresen, 3425 Margaret Ave., Stow, Ohio

Filed Sept. 17, 1956, Ser. No. 610,098

7 Claims. (Cl. 307—88.5)

This invention relates to electrical apparatus for selectively conducting and suppressing voltage amplitudes so that only voltage amplitudes of a selected magnitude are passed and other voltage amplitudes are rejected.

The invention is equally adaptable for the suppression of low and high magnitudes of voltage amplitudes of select values in unipolarity or alternating polarity voltage utilization systems.

In voltage information utilization systems, such as radio, audio, television, pulse circuits and the like, it is often desirable to suppress certain voltage amplitudes and to utilize only voltage amplitudes of selected magnitude.

It is an object of this invention to provide efficient means for selectively passing voltage amplitudes of desired magnitude while suppressing voltage amplitudes of magnitudes not desired.

A further object of the invention is to employ transistors for this purpose.

Another object of the invention is to employ conductance determining voltages for the precise determination of the transistor operating point in respect to the input voltage information.

Still a further object is to provide for the use of an output determining voltage proportional to the input voltage for the precise determination of the degree of inversion and suppression of the output voltage.

A further object is to provide practical circuits for utilization of the transistor inverter suppressor and for obtaining the conductance determining and output determining voltages.

Other features of the invention and its advantages not specifically enumerated will be apparent after a consideration of the following detailed description and the appended claims, reference being had to the accompanying drawings forming a part hereof.

In the drawings which disclose at least one preferred form of the invention,

Fig. 1 is a schematic wiring diagram which practically demonstrates the aspects and versatility of the invention. The diagram discloses an input circuit, an output circuit, and a coupling means having susceptibility to voltage drop due to current conduction, including transistor means and conductance determining and output determining voltages for control of the transistor operating parameters in respect to the undesirable input voltage, etc.

Fig. 1a is a graph showing input voltages of Fig. 1 plotted against output voltage thereof.

Figure 2:
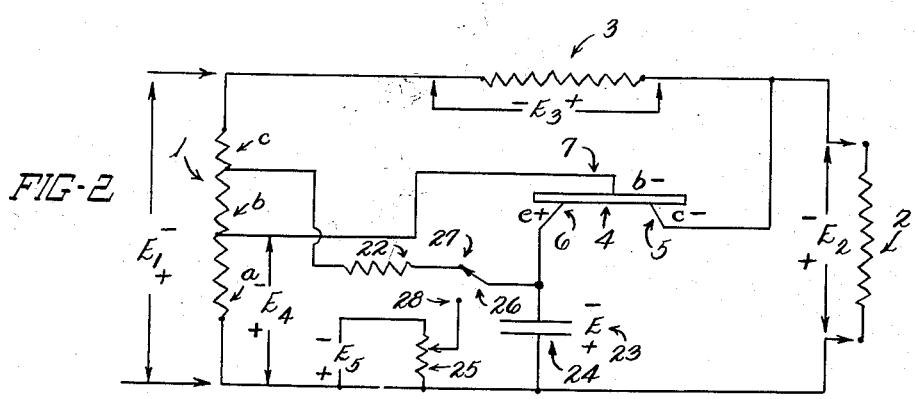
Figs. 2, 3 and 4 are simplified circuits showing the more specific applications of the invention including suggested means for obtaining the conductance determining voltage and the output determining voltage for both low and high magnitudes of input voltage for the transistor operating points and for determining the magnitude of inversion or suppression level for the output voltage.

Referring to Fig. 1, the numeral 1 denotes an input circuit across which appears an input voltage $E_1$ of variable magnitude. The output circuit 2 develops an output voltage $E_2$ by virtue of the coupling means 3 coupling the input and output circuits. The coupling means 3 may be a simple resistance or any electrical coupling means having a voltage drop susceptibility $E_3$ due to the influence of electric current. The input voltage $E_1$ normally suffers a slight attenuation due to the voltage $E_3$ before it appears across the output load 2 as voltage $E_2$. A plurality of shunt transistors 4, 4' and 11, 11', respectively, are shown to demonstrate the broader aspects of the concepts of this invention, each transistor operating to suppress a different undesirable high or low voltage magnitude or polarity. The collector elements 5, 5' and 13, 13' of these transistors, respectively, are connected to the output circuit 2 by a pair of crystal or other diodes 11, 11' permitting current flow in only one direction, collectors 5 and 13 being connected by diode 11 for current flow through the diode only when the output circuit voltage $E_2$ at point C is negative in respect to point A, and collectors 5' and 13' being connected by diode 11' for current flow through the diode only when the output voltage $E_2$ at point C is positive in respect to point A.

The emitter element 6 of transistor 4 is connected to the input circuit 1 through a bias voltage 8 established across a capacitor 24. The emitter 6' of transistor 4' is connected to the input circuit through a bias voltage 8' established across a capacitor 24', a resistance 19' and a crystal or other diode 21' connected to permit current flow through the diode only when the input voltage $E_1$ at point B is positive in respect to point A. The emitter 14 of transistor 12 is biased through a resistor 18 and a bias voltage means 17. Emitter 14 also connects to input circuit 1 by way of a capacitor 20 and diode 21 connected to permit current to flow through the diode only when the input voltage $E_1$ at point B is negative with respect to point A. A resistor 19 is connected from the junction of diode 21 and capacitor 20 to point A. Emitter 14' of transistor 12' is biased by voltage 17' through resistor 18'. Emitter 14' is coupled to the input circuit 1 through capacitor 20' and a crystal or other diode 21'. The diode 21' is electrically conductive only for input circuit voltages $E_1$ positive at point B in respect to point A. The base elements 7, 7' of transistors 4, 4' are connected to the input circuit through bias voltage means 9, 9' such as capacitors 34, 34' having a voltage value of zero or higher. The base elements 15, 15' of transistors 12, 12' are connected to the point A of the input and output circuit through a bias voltage means 16, 16' such as capacitors 30, 30' having a voltage value of zero or higher. For values of desirable input voltages, the transistors are inactive, and the above said elements 1, 2, 3 comprise the only active circuit elements for coupling the input voltage variables, or information $E_1$ to the output 2 as voltage $E_2$. When the coupling means 3 is a resistor, the output voltage $E_2$ suffers no distortion, and only a nominal loss of magnitude due to $E_3$, for moderate frequencies or rise time of the input voltage $E_1$. It is obvious that for fast rise time variables of the input voltage $E_1$ the inherent capacitive reactance of the circuit will require reactance correction to adjust the output voltage and phase response characteristics. Since the reactive correction techniques are well understood, they will be given no further consideration in this specification except to say that when fast rise time voltages are utilized by the invention such practices may be applied without prejudice.

The transistor 4 is substantially inactive, as are transistors 4', 12 and 12' during periods when the input voltage $E_1$ magnitudes are within the desired values; the nonconductive state of the transistors is known to be actually weakly conductive, but only to such a negligible extent as to have little or no effect upon the coupling circuit characteristics. The object of the transistors in this circuit is to afford a large voltage drop $E_3$ over the coupling means for values of input voltage $E_1$ having undesirable magnitudes. The effect of transistor conduction is to cause an inversion or suppression of the output voltage $E_2$ in respect to the amplitude or magnitude of the input $E_1$ to output $E_2$ relationship that would normally prevail for conditions causing transistor inactivity.

To obtain the above described and other novel input voltage $E_1$ to output voltage $E_2$ relationships, the collector elements 5 and 13 are in electrical connection to the coupling means 3 and the output circuit 2. The transistor collector element 5 is normally made nonconductive to the desired magnitudes of input voltage $E_1$ by virtue of a conductance determining bias voltage means 8 and 9 in series electrical connection with the emitter 6 and base 7 elements of transistor 4, the control voltage $E_4$ being derived from the input voltage $E_1$ by virtue of the voltage drop over a segment of the input circuit. It is desired that the transistor 4 be conductive only for input voltages $E_1$ starting at some value greater than zero and for all higher magnitudes, therefore the sum of the conductance determining voltages 8 and 9 shall have a polarity for preventing conduction in emitter 6 and base 7 and of a value equal to the value of the control voltage $E_4$ when the input voltage $E_1$ reaches an undesirable magnitude; for all higher values of input voltage $E_1$ the transistor emitter 6 and base 7 become conductive to electric charge carriers and the collector 5 supplies charge carriers for electric current ($I_c$) through the coupling means 3 substantially equal to or greater than the value of the emitter current. The collector current $I_c$ causes an additional voltage drop over the coupling means 3, thus increasing the voltage $E_3$, effecting a reduction of the output voltage $E_2$ for periods when the transistor 4 is rendered conductive. The sum of voltages $E_2$ and $E_3$ can not exceed the input voltage $E_1$, therefore, if the inversion or suppression of $E_2$ is selectively limited, all higher voltage drops due to higher input voltage magnitudes must appear across the coupling means as increased value of $E_3$, and all higher input magnitudes $E_1$ have no further effect on the value of $E_2$ when $E_2$ has been inverted or suppressed to its output determining voltage 8, which determines the inversion or suppression limit of the output voltage. The output voltage is not limited for conditions that prevent transistor conduction. The inversion or suppression limit of the output circuit voltage $E_2$ of transistor 4 is determined by the voltage 8 which functions both as the conductance determining voltage or portion thereof, and as the output determining voltage for determining the lowest value of the collector element and output voltage for periods of maximum values of the collector 5 current $I_c$, because it follows that in this circuit, the collector 5 voltage cannot fall below its emitter 6 potential, which is the value of voltage 8. The circuit also shows voltage 9 in series connection with the emitter 6 and base 7 circuit and the control voltage $E_4$. However, since the total conductance voltage should equal $E_4$, the single voltage 8 will function both as the output determining voltage and the conductance determining voltage, if the portion $E_1$ input voltage $E_4$ acting as the control voltage is made equal to the output determining voltage 8. The proportioning of $E_4$ in respect to the operating point of the input voltage magnitude may be effected by proportioning the input circuit segments. On the other hand there may be situations, for example, when the desired output inversion may be zero, and for these conditions voltage 8 would be zero; therefore, it would be expedient to employ voltage 9 as the conductance determining voltage for the transistor 4. Values of $E_4$ exceeding voltage 9 would cause transistor 4 conduction and inversion of the output $E_2$ to zero for higher voltage magnitudes of $E_1$. The unidirectional conductive means 11 may be a diode device to afford conduction only for the correct $E_1$ polarity for the collector elements 5 and 13 of transistors 4 and 12 respectively. The diode 11 is not required when $E_1$ is of one polarity.

The collector 13 of transistor 12 is electrically connected to the coupling means 3 and the output circuit 2. Transistor 12 has the function of suppressing low values of input voltage $E_1$ from zero to some higher magnitude, at which point and for all higher magnitudes of input voltage $E_1$ the transistor is inoperative as a suppressor. The transistor 12 operates in the same manner to increase the voltage $E_3$ as the transistor 4, except that its emitter 14 and base 15, and its conductance determining voltages 16 and 17 are poled to cause conduction from zero $E_1$ and higher until the control voltage $E_4$ exceeds the sum of voltages 16 and 17, causing the emitter 14 and base 15 voltages to reverse to the nonconductive polarity, causing the collector 13 current $I_c$ to return to substantially zero. For all values of input voltage exceeding the point where the transistor stopped conducting, the effect of the transistor on the voltage coupled to the output through the coupling means 3 is substantially nonexistent, and the voltage information appears undistorted at the output.

The conductance determining voltage 16 also functions as the output determining voltage for the collector 13 of the transistor 12 during the periods of conduction. Voltage 16 alone may be used as the conductance determining voltage, if its relationship to the control voltage $E_4$ is equal when the input voltage $E_1$ value has attained the value above zero for which higher $E_1$ values are to be coupled to the output without influence by the transistor 12. If the output determining voltage 16 is to be lower than the $E_4$ control voltage, then it is expedient to employ the conductance determining voltage 17 so that the sum of 16 and 17 equals the control voltage $E_4$ at its operating point, thereafter, for all higher input voltages $E_1$ the transistor 12 is made nonconductive and ineffectual upon the voltage coupled to the output circuit.

The upper portion of the drawing, Fig. 1, comprising transistors 4' and 12', and the associated circuit elements, conductance determining voltages, output determining voltages, and control voltages, items 4' through 21', duplicates the above described functions of transistors 4 and 12, with this exception—the transistors 4' and 12' and their respective voltages are selected to operate on the opposite polarity of input voltage $E_1$. The related elements etc. are numbered the same as the above described elements, except, to distinguish the different polarity, prime numbers are used. When the proper transistor and voltage polarities are chosen and connected in parallel as shown, voltages of opposite polarities and alternating polarities may be suppressed. When the transistors 4, 4' and 12, 12' are connected in the manner shown, unidirectional means or diodes 11, 11' and 21, 21' are required for electrically connecting the transistors into the circuit for periods when the polarity of the input voltage $E_1$ is correct for those transistors required to operate on that polarity. Another expedient being to employ the direct current isolation circuit comprising the resistors 18, 18' and 19, 19' and the coupling capacitor 20, 20'; this expedient allows the diodes 21, 21' to conduct input voltage $E_1$ into the transistor conductance voltage circuit, from zero $E_1$ voltage and above on their respective conductance polarities.

The low level voltage suppressors 12 and 12' may be employed in circuits where only voltages of opposite polarities above a selected magnitude are to be utilized, and the high level voltage suppressors 4 and 4' may be omitted if high level suppression is not required. Conversely, the high level voltage suppressors may be employed in circuits where only voltages of opposite polarities below a certain magnitude are to be utilized, and the low level voltage suppressors 12, 12' may be omitted if low level suppression is not required. The above functions are shown for Fig. 1 in the $E_1-E_2$ graph of Fig. 1a. For reasons of simplification assume for Fig. 1 that $E_4=E_1$ and that the impedence of the output load is infinite.

In order to facilitate the required proportionality adjustment of the transistor conductance determining voltages in respect to the input voltage $E_1$ magnitudes, these voltages reside in capacitors 20, 24, 30 and 34 as to transistors 4 and 12 and in capacitors 20', 24', 30', and 34' as to transistors 4', 12'. The means for producing adjustable voltages in capacitors is explained for Figs. 2, 3 and 4 as follows:

In reference to drawing, Fig. 2 which discloses the transistor 4 of Fig. 1 in a simplified application of the invention in a circuit adapted to couple low level voltage $E_1$ magnitudes, and to invert and suppress higher level voltages of $E_1$ in the output circuit voltage $E_2$. The conductance determining voltage 23 is obtained through a resistor 22 connection to the input load 1. The voltage being integrated by virtue of the time constant of resistor 22 and capacitance 24, so that it is substantially a steady state for the lowest rate of rise time of the input voltage $E_1$ modulations. The voltage 23 is both the conductance determining voltage and the output determining voltage in this circuit.

For the purpose of showing a practical application, it may be assumed that the input voltage $E_1$ is the unipotential output of a radio or television detector, and that the voltage 23 is to be adjusted by virtue of the proportionality of the input load segments $a$—$b$—$c$ to represent the average modulation level for the output voltage $E_2$ which is the zero modulation level for the radio application, or the average picture voltage (grey level) for the television application. The control voltage $E_4$ is so proportioned in respect to the input voltage $E_1$ by virtue of the load segments $a$—$b$—$c$, that, for the radio application, when $E_1$ is 100% modulated, $E_4$ equals voltage 23 whereby all higher input voltages $E_1$ or noise voltage causes transistor conduction and inversion or suppression of the output voltage $E_2$ to the zero modulation level. The control voltage $E_4$ is so proportioned in the television application, that, when $E_1$ represents the level slightly above the synchronization pulse voltage peaks, $E_4$ causes transistor conduction for higher voltage or noise, and the output voltage $E_2$ is inverted to the average, or grey level voltage 23 of the picture. The above described transistor functions are shown for Fig. 2 in the $E_1-E_2$ graph of Fig. 1a.

The switch 26 is included to demonstrate how the voltage 23 may be obtained from a manually adjusted control potentiometer 25 from a source $E_5$, whereby switch 26 is removed from contact 27, "automatic connection," to the contact 28 for adjustable fixed control for suppression of pulse or telegraph voltage information to the value selected by the potentiometer 25.

Figure 3:
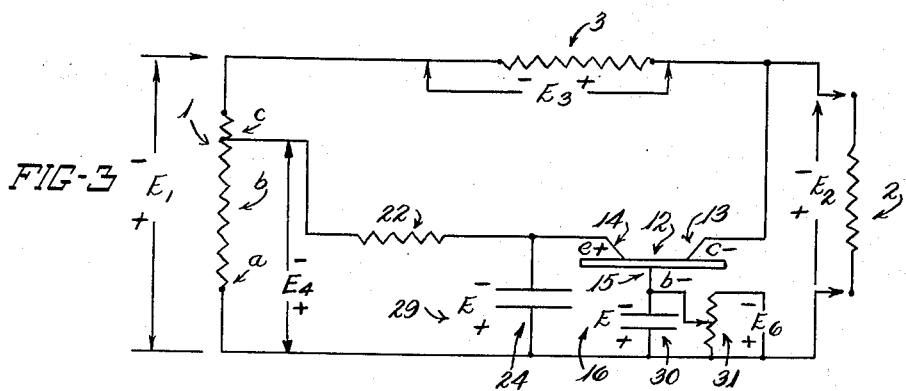

In reference to drawing, Fig. 3, which discloses the transistor 12 of Fig. 1, in a simplified application of the invention in a circuit adapted to couple high level voltage $E_1$ magnitudes, and to invert and suppress low level voltages in the output circuit voltage $E_2$. The transistor conductance determining voltage 16 is obtained by adjustment of a potentiometer 31 from a voltage source $E_6$. The control voltage 29 is obtained through a resistor 22 connection to the input load. The voltage 29 may be given a time constant by virtue of the capacitor 24 and the resistance 22; or the resistance 22 and the capacitance 24 may be zero for response to fast rise time rates of the input $E_1$ modulations.

For the purpose of showing a practical application, it may be assumed that the input voltage $E_1$ is the unipotential output of a radio detector, and that the voltage 29 is adjusted by virtue of the proportionality of the load segments $a$—$b$—$c$, that for a level of input voltage $E_1$ of a desirable value, the control voltage 29, is equal to the conductance determining voltage 16. For all higher values of control voltage 29 greater than voltage 16, the polarity of the voltage applied to the transistor emitter 14 and base 15 elements is such that conductivity is impossible, whereby the collector element 13 no longer conducts the current $I_c$ through the coupling means 3, the output voltage $E_2$ is no longer suppressed to the voltage 16, which is also the output determining voltage, and thereafter the higher values of input voltage $E_1$ appear in the output voltage $E_2$ undistorted. Should the resistor 22 and the capacitor 24 represent a substantial time constant in respect to the rise time of $E_1$ voltages, then the system would function in the manner typical of the "squelch" systems, wherein the circuit opens only for values of input voltage which average the control voltage 29 to exceed the conductance control voltage 16, and for all higher average values of input voltage $E_1$ the transistor is thereafter nonconductive for all input magnitudes from zero to higher values. The above described transistor functions are shown for Fig. 3 in the $E_1-E_2$ graph of Fig. 1a.

Figure 4:
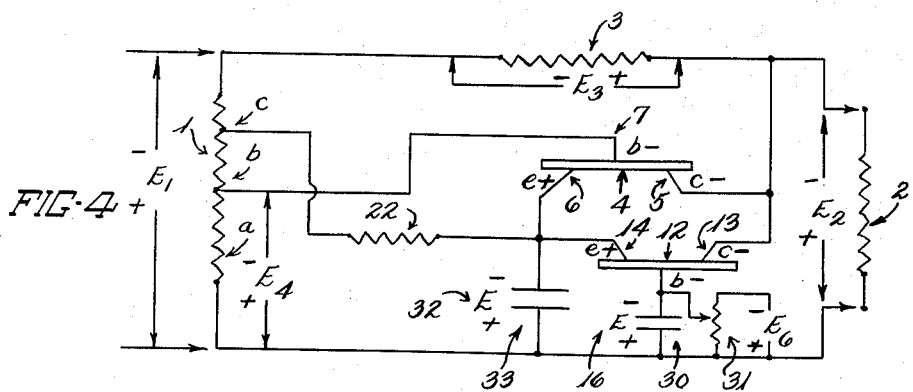

In reference to drawing, Fig. 4, which discloses the transistors 7 and 12 of Fig. 1 in a simplified application of the invention in a circuit adapted to couple values of unidirectional or unipolarity input voltages $E_1$ which average the control voltage 32 for transistor 12 to values above the conductance determining voltage 16. For all average values of voltage 32 that exceed voltage 16 the transistor 12 collector element 13 is thereafter non-conductive, and transistor 12 is ineffective for the desirable magnitudes of input voltage $E_1$ the input voltage is coupled undistorted to the output circuit. The transistor 4 utilizes the voltage 32 as a conductance determining voltage connected in electrical series with the emitter 6 and base 7 elements and the control voltage $E_4$. The proportionality of the load 1 segments $a$—$b$—$c$ is such, that, for $E_1$ input voltage of magnitudes above a desired level, the voltage $E_4$ exceeds the conductance determining voltage 32 for transistor 4, whereby for all higher voltages the polarity of the voltage applied across the emitter 6 and base 7 elements causes conduction of electric charges, and the collector element 5 conducts current $I_c$ through the coupling means 3, whereby the output voltage $E_2$ is inverted and suppressed to the level of voltage 32, because the voltage 32 functions also as the output determining voltage for the transistor 4.

For purposes of practical application, assume that the voltage $E_1$ of Fig. 4 is the output of a radio detector. A practical adjustment of the proportionality of segments $a$—$b$—$c$ would be the average output voltage $E_2$ value, which represents zero modulation. The voltage 16 is selected to equal voltage 32 when the input $E_1$ has reached a point where the "squelch" effect of transistor 12 is to be disabled. The proportionality of the segments $a$—$b$—$c$ for the voltage $E_4$ is adjusted equal to the conductance determining and output determining voltage 32 for the point of 100% modulation of the input voltage $E_1$, whereby for all higher magnitudes of input voltage, or noise voltages, the output voltage is inverted or suppressed to the level of voltage 32, which is the level of zero modulation for the output voltage $E_2$. The above described transistor functions are shown for Fig. 4 in the $E_1-E_2$ graph of Fig. 1a.

The emitter or collector designation referred to is that element of the transistor functioning as the emitter or collector. It is well known that, for reasons of engineering choice, either end of the transistor may be used as the emitter or the collector element without prejudice.

The following table gives the values that have been found satisfactory for the parts of the circuits of Figs. 2, 3 and 4.

Part No.:
- 1a — 4.7K.
- 1b — 3.3K.
- 1c — 1.5K.
- 2 — 8.7K.
- 3 — 3.3K.
- 4, 12 and 4', 12' PNP and NPN — Transistor respectively (high $I_c$ sensitivity).
- 22 — 20K.
- 24—30—33 — 10 mfd.
- 25—31 — 10K pot.

NOTE.—Should the input load 1 be a rectifier load, a suitable bypass capacitor should be provided for the rectified high frequency current. The value 8.7K is the total impedance, reactance or resistance of the output or utilization load.

(The above proportionalities are substantially correct for load values between a few hundred ohms to values over one hundred thousand ohms.)

The polarities noted on the drawing are for conditions when the respective transistors and diodes are conducting.

The above practical applications of the invention are distinquished by the fact that the transistors are disabled during the periods when desirable input voltage magnitudes are to be coupled between the input and output circuit. A further distinction lies in the flexibility of the function of the conductance determining voltages, and in the choice between the transistors having different polarities, or which afford conductance only for a select polarity of voltage. In this regard, it is recognized, and understood, that semiconductor devices or transistors; having additional elements and connections would also operate according to this concept. This invention is restricted not only to those transistors having emitter, base, and collector elements, but to semiconductor devices or transistors having at least the electric charge injector or emitter element, the base element, and the collector or output utilization element.

While a certain representative embodiment and details have been shown for the purpose of illustrating the invention, it will be apparent to those skilled in this art that various changes and modifications may be made therein without departing from the spirit or scope of the invention.

I claim:

1. A signal coupling and amplitude inverter suppressor system comprising an input circuit across which an input signal voltage of desirable magnitudes is applied with possible undesirable voltage magnitudes, an output circuit, a signal coupling means having voltage drop susceptibility to current connected between said input and output circuits, a capacitor, a transistor having as elements a collector, an emitter and a base, the collector and one of the other elements of said transistor being in series electrical connection with said capacitor and connected in shunt across said output circuit, the base element and one of the other elements of said transistor being in series electrical connection with said capacitor and connected in shunt across at least a portion of said input circuit, and a circuit means for applying a voltage proportional to said input signal voltage across said capacitor to prevent transistor conductance during the coupling of a desired signal input voltage and to cause transistor conductance across said output circuit for input voltage of undesirable magnitudes.

2. A signal coupling and amplitude inverter suppressor as defined by claim 1 in which the circuit means for applying a voltage proportional to said input signal voltage across said capacitor includes a voltage proportioning means connected to said input circuit.

3. A signal coupling and amplitude inverter suppressor as defined by claim 1 in which a second capacitor is connected in series with one of said transistor elements and said input circuit.

4. A signal coupling and amplitude inverter suppressor as defined by claim 1 in which a second capacitor is connected in series with one of said transistor elements and said input circuit, including means for applying a voltage proportional to the input signal across said second capacitor.

5. A signal coupling and amplitude inverter suppressor as defined by claim 1 including a diode preventing conductance during reverse polarity in series connection between said input circuit and one of said transistor elements.

6. A signal coupling and amplitude inverter suppressor as defined by claim 1 including a diode preventing conductance during reverse polarity in series connection between said input circuit and one of said transistor elements, said diode being in series connection with said second capacitor.

7. A signal coupling and amplitude inverter suppressor as defined by claim 1 including a diode preventing conductance during reverse polarity in series connection between said input circuit and one of said transistor elements, said diode being in series connection with said second capacitor and said signal coupling and amplitude suppressor also including a second diode preventing conductance during a reverse polarity in series connection between said output circuit and one of said transistor elements.

References Cited in the file of this patent

UNITED STATES PATENTS

| | | |
|---|---|---|
| 2,693,568 | Chase | Nov. 2, 1954 |
| 2,698,416 | Sherr | Dec. 28, 1954 |
| 2,728,053 | Bangert | Dec. 20, 1955 |
| 2,728,857 | Sziklai | Dec. 27, 1955 |
| 2,733,415 | Bangert | Jan. 31, 1956 |
| 2,751,545 | Chase | June 19, 1956 |
| 2,776,382 | Jensen | Jan. 1, 1957 |

OTHER REFERENCES

"Theory and Applications of Electron Tubes" by H. J. Reich, 2nd ed., McGraw-Hill, 1944, Figs. 14–21Ac), page 591.